Jan. 26, 1954
G. E. HANSEN
2,667,324
COLLAPSIBLE VALVE
Filed Dec. 27, 1948
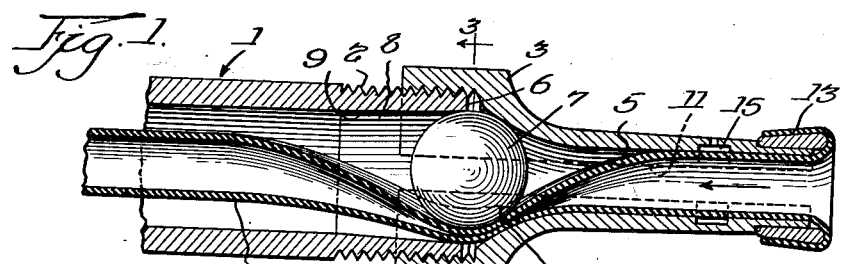
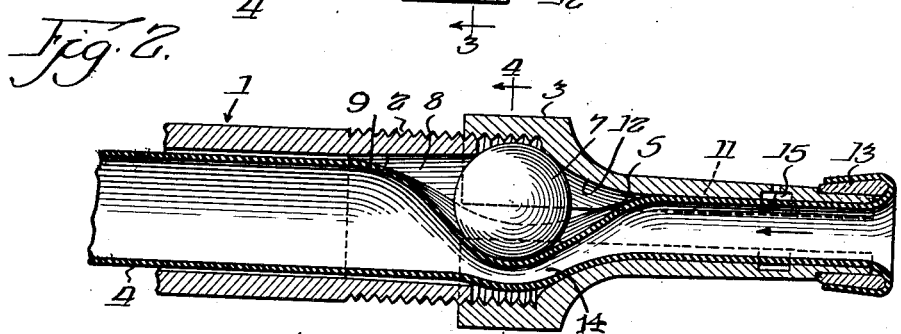
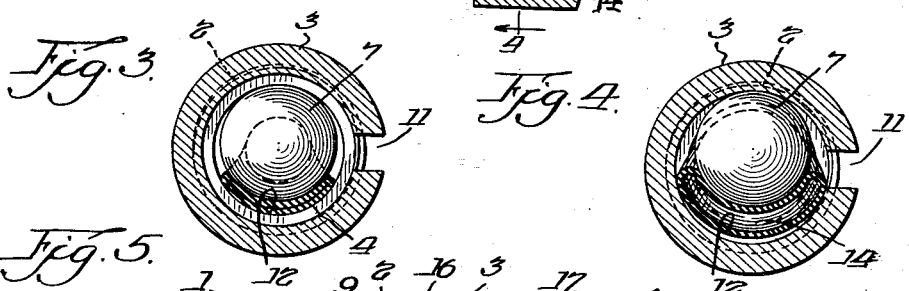
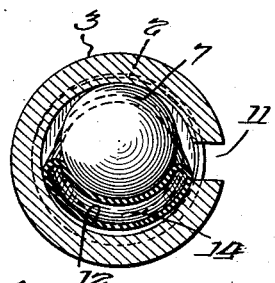
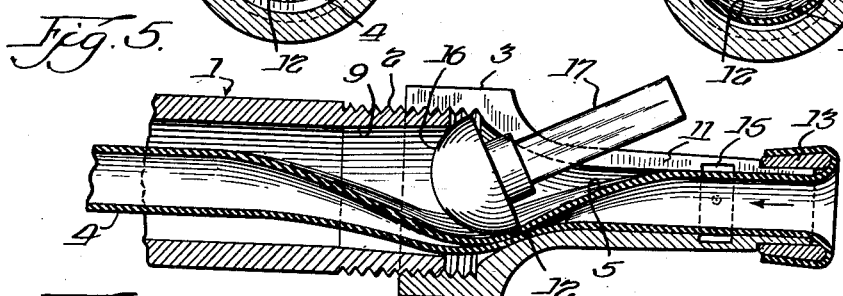
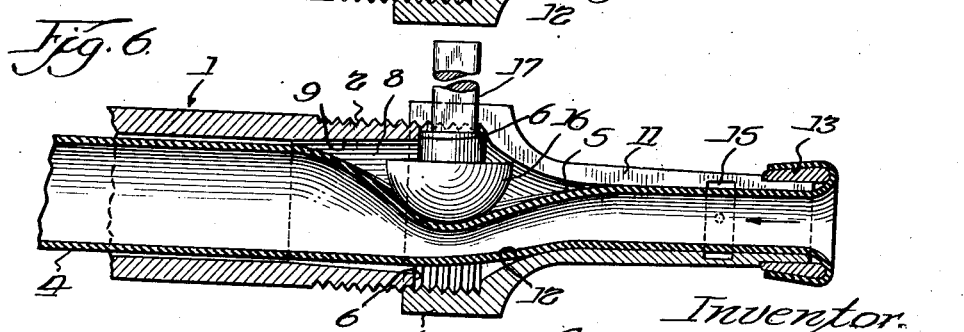
Inventor.
George E. Hansen.
By Joseph O. Lang Atty.

Patented Jan. 26, 1954

2,667,324

UNITED STATES PATENT OFFICE 2,667,324

COLLAPSIBLE VALVE

George E. Hansen, Chicago, Ill., assignor to Crane Co., Chicago, Ill., a corporation of Illinois Application December 27, 1948, Serial No. 67,330

3 Claims. (Cl. 251—5)

This invention relates to a combined valve and fixture. More particularly, it is concerned with a novel valve whereby tubing such as rubber tubing or the like may be employed as the fluid carrying medium where desired, and the control of the orifice therethrough may be easily accomplished by a simple valve mechanism. At the same time, such tubing may be easily formed into an end joint or connection therewith as will hereinafter become more readily apparent.

In the latter connection, it should be realized that heretofore one of the difficulties encountered in valve designs of this type has been traceable to the inability to obtain effective means for applying the rubber tube or hose to the fixture.

Other objects and advantages will become more readily apparent upon proceeding with the description of the structure read in light of the accompanying drawings, in which Fig. 1 is a transverse sectional assembly view of the combined valve fixture embodying the invention.

Fig. 2 is a view similar to that of Fig. 1, except that the valve is shown in the open position.

Fig. 3 is a transverse sectional view taken on the line 3—3 of Fig. 1.

Fig. 4 is a transverse sectional view taken on the line 4—4 of Fig. 2.

Fig. 5 is a sectional assembly view of a modified form of the invention.

Fig. 6 is a view similar to that structure of Fig. 5, but with the valve shown in the open position.

Similar reference numerals refer to similar parts throughout the several views.

Referring now to Fig. 1, a pipe or tubular member, generally designated 1, is shown with threads 2 upon which is threadedly engaged the holder or fixture 3. At the outset, it should be understood that the pipe 1 is initially lined with the rubber or other flexible tube 4, the end portion of which rubber tube, as designated at 5, is stretched and extends substantially beyond the threaded end 6 of the threaded tubing 1. A sphere 7 of predetermined size is substantially provided of the size or diameter as the slightly tapered chamber 8, the taper being designated 9. The rubber tube 4 is inserted within the fixture 3 by means of the slot 11 so as to be received therebetween as shown in Fig. 1. The sphere 7 is placed in position over the tubing 4 before the holder 3 engages the threads 2 of the tubular member 1. In making such insertion, the rubber hose 4 is predeterminately stretched and thereby reduced in diameter until the proper tension thereof is obtained. The sphere is then placed inside the holder 3, as illustrated, and held firmly relative to the pipe 1 by means of the threads 2. It will, of course, be apparent that by turning the holder 3 to rotate upon the threads 2, the sphere 7 will be moved axially and thereby compresses the stretched rubber hose against the inside of the holder, as at the camming contact surface 12. The relative rotatability between the members 1 and 3 is preferably limited to substantially less than a full turn to avoid objectionable twisting of the flexible tube 4 in the course of opening or closing the valve.

The foregoing operation secures the hose against the pipe and also prevents it from slipping back or being axially displaced because of the pinching action of the sphere 7, as indicated. Thus, it will also be apparent that by reason of such pinching or compressing action, the sphere 7 serves as a fluid shut-off so that when line fluid pressure is applied from the direction indicated by the arrow, the flow of the latter is shut off as shown in Fig. 1. The outer end limit of the flexible tubing 4 is stretched or expanded, folded back and applied over the outer annular surface of ferrule 13 as indicated. The slot 11 preferably extends for the full length of the holder 3 and thereby when desired enables the operator to slip the hose 4 transversely through the slot 11 and thus remove the holder, leaving only the ferrule 13 remaining on the tubing. The ferrule 13 is mounted on the holder by merely slipping same over the outer end limits of the flexible tubing. The tubular connection at the ferrule is adapted for securing to a pipe line (not shown).

In the section at Fig. 4, there is shown the transverse sectional view when the predetermined axial position of the sphere enables the tubing 4 to be maintained in the open-valve or flow-permitting relation, fluid flow occurring through the passage 14 of the tubing 4.

If desired, an inlet supply for the insertion of rubber cement or the like may be provided as at 15 which permits the tubing 4 to be more rigidly and securely attached.

In the modified form shown in Figs. 5 and 6, the invention principle is the same as that above described in connection with Figs. 1 to 4 inclusive, except that the disc 16 with the projecting handle 17 is used instead of the sphere 7. Tubing 5 is admitted into the holder 3 by means of the slotted portion 11 in the same manner as that described in connection with Fig. 1. In the instant modification, however, the handle 17 is pressed downwardly as illustrated to thereby compress the rubber hose and the holder is locked or held firmly in place as indicated in Fig. 5.

When it becomes necessary to open the valve, that is by eliminating the pinching of the tubing, the result is obtained but the manual control differs slightly from that described in Fig. 1. In the open position, the small disc with its handle 17 is clamped between the ends of the tubing 1 and the inside 12 of the holder 3 as indicated, to permit flow therepast.

Thus, it is clear that a relative simple but effective means has been devised not only to provide a very efficient valve per se, but it also may be employed to aid in making the folded-over tubing connection with the ferrule 13 with the valves 7 or 16 in the closed position and the ferrule 13 in place as shown.

Of course, it should also be apparent that a number of other modifications may be employed with similar and satisfactory results. Therefore, it is the desire not to be limited to the specific embodiments illustrated but to measure the invention by the scope of the appended claims interpreted in light of the prior art.

I claim:

1. In a fixture of the class described, the combination including a substantially tubular member, a holder having an inner surface camming portion, flexible tubing comprising a conduit portion within said holder and tubular member, the said holder having an axially extending slot through an outer wall thereof for inserting a continuous length of the said flexible tubing within the holder, the holder member being relatively rotatable to the said tubular member and flexible tubing and being axially movable relative thereto, freely movable means comprising a sphere member interposed between said tubular member and the holder and the flexible tubing, the tubular member and holder defining a recess between the camming surface and the end of the tubular member of larger diameter than that of the sphere member plus twice the thickness of the flexible tubing, the sphere member being positioned in said recess in the valve-open position, the inner diameter of an end portion of the tubular member being of smaller diameter than that of the sphere member plus twice the thickness of the flexible tubing, the end portion of the said tubular member engaging the said sphere member, the inner surface camming portion of said holder also engaging the said sphere member and camming the latter member towards the flow axis whereby upon predetermined relative rotation and axial movement of the said holder in a direction towards the said tubular member the said freely movable means is held against an outer portion of the flexible tubing and the end portion of the said tubular member to shut off flow therethrough.

2. In a combined fixture and valve, a tubular casing, a holder removably attached to the said casing, the said holder having an inner surface camming portion and being axially and rotatably movable relative to the said casing, a sphere form of closure member interposed between an inside end wall of said tubular casing and the inner surface camming portion of the said holder, the said holder having an axially extending slot through an outer wall thereof, flexible tubing with a conduit portion insertable through said slot and extending continuously between the said holder and the casing, a portion of the said closure member bearing snugly against an outer portion of the flexible tubing, the said tubular casing and holder defining a recess between the camming surface portion and the end of the tubular casing of larger diameter than that of the closure member plus twice the thickness of the flexible tubing, the said closure member being positioned in said recess in the valve-open position, the inner diameter of an end portion of the tubular casing being of smaller diameter than that of the closure member plus twice the thickness of the flexible tubing, the end portion of the said tubular casing engaging the spherical portion of the closure member, the camming surface of the holder also engaging the said spherical portion and camming the latter member towards the flow axis against the outer portion of the flexible tubing and the end portion of the said tubular casing to shut off fluid flow therethrough.

3. In a fixture of the class described, the combination including a substantially tubular member, a relatively rotatable holder having an inner camming surface and axially movable relative to the said tubular member, flexible tubing with a conduit portion within said holder and tubular member, annular connecting means for said flexible tubing on an end portion of the said holder, the said holder having an axially extending slot in a wall portion thereof for inserting a stretched length of the flexible tubing within the holder and over the annular connecting means, the holder member being threadedly secured to the said tubular member and rotatable relative to the latter member and the flexible tube pinching means comprising a freely rotatable sphere of a larger diameter than the conduit portion of the flexible tubing on which it is wedged to collapse the tubing in a valve-closed position and being of a lesser diameter than that of the conduit portion on which it is positioned to allow fluid flow in a valve-open position, the said sphere being interposed between said tubular member and the holder and the flexible tubing, the tubular member and holder defining a recess between the inner camming surface and the end of the tubular member of larger diameter than that of the said sphere plus twice the thickness of the flexible tubing, the said sphere being positioned in said recess in the valve-open position, the inner diameter of an end portion of the tubular member being of smaller diameter than that of the said sphere plus twice the thickness of the flexible tubing, the end of said tubular member engaging the said sphere member, the inner camming surface of said holder also engaging the said sphere member and camming the latter member towards the flow axis whereby upon predetermined rotational and axial movement of the said holder means towards the tubular member the said pinching means is applied against an outer surface portion of the inserted flexible tubing to shut off fluid flow therethrough.

GEORGE E. HANSEN.

References Cited in the file of this patent

UNITED STATES PATENTS

| Number | Name | Date |
|---|---|---|
| 492,580 | Hadley | Feb. 28, 1893 |
| 653,629 | Schneider | July 10, 1900 |
| 1,883,960 | Koppel | Oct. 25, 1932 |
| 2,197,995 | Crowley | Apr. 23, 1940 |
| 2,442,746 | Anderson | June 8, 1948 |
| 2,444,767 | Cobean | July 6, 1948 |
| 2,458,027 | Quist | Jan. 4, 1949 |

FOREIGN PATENTS

| Number | Country | Date |
|---|---|---|
| 21,170 | Great Britain | of 1899 |
| 28,631 | Germany | of 1884 |
| 179,527 | Switzerland | of 1936 |